(12) United States Patent
Banet et al.

(10) Patent No.: US 11,261,323 B2
(45) Date of Patent: *Mar. 1, 2022

(54) CONFORMABLE THERMOPLASTIC COMPOSITIONS AND ARTICLES

(71) Applicant: Banemer, LLC, Lansdale, PA (US)

(72) Inventors: Craig Banet, Bryn Mawr, PA (US); Jeffrey Jacob Cernohous, Hudson, WI (US); Paul E. Humpal, Stillwater, MN (US); Nathan W. Ockwig, Eagan, MN (US); Kristi R. Cernohous, Hudson, WI (US)

(73) Assignee: BANEMER, LLC, Lansdale, PA (US)

( * ) Notice: Subject to any disclaimer, the term of this patent is extended or adjusted under 35 U.S.C. 154(b) by 229 days.

This patent is subject to a terminal disclaimer.

(21) Appl. No.: 16/106,973

(22) Filed: Aug. 21, 2018

(65) Prior Publication Data

US 2019/0062548 A1 Feb. 28, 2019

Related U.S. Application Data

(60) Provisional application No. 62/549,685, filed on Aug. 24, 2017.

(51) Int. Cl.
  *C08L 67/04* (2006.01)
(52) U.S. Cl.
  CPC ......... *C08L 67/04* (2013.01); *C08L 2205/025* (2013.01)
(58) Field of Classification Search
  CPC .............................................. C08L 75/04–16
  See application file for complete search history.

(56) References Cited

U.S. PATENT DOCUMENTS

| | | |
|---|---|---|
| 3,985,703 A | 10/1976 | Ferry et al. |
| 4,965,135 A | 10/1990 | Im et al. |
| 5,128,183 A | 7/1992 | Buzio |
| 5,154,964 A | 10/1992 | Iwai et al. |
| 5,238,631 A | 8/1993 | Stolk et al. |
| 5,494,969 A | 2/1996 | Abe et al. |
| 5,607,748 A | 3/1997 | Feltman |
| 5,760,118 A | 6/1998 | Sinclair et al. |
| 5,827,461 A | 10/1998 | Feltman |
| 5,989,683 A | 11/1999 | Haddock et al. |
| 6,663,809 B1 | 12/2003 | Haddock et al. |
| 6,673,413 B1 | 1/2004 | Kincel et al. |
| 7,011,879 B1 | 3/2006 | Contreras et al. |
| 7,363,686 B2 | 4/2008 | Fukuyasu et al. |
| 8,816,008 B2 | 8/2014 | Pirri et al. |
| 9,452,593 B2 | 9/2016 | Tatarka et al. |
| 2005/0154114 A1* | 7/2005 | Hale ................... C08L 67/02 524/436 |
| 2012/0021151 A1 | 1/2012 | Tatarka et al. |
| 2014/0066564 A1* | 3/2014 | Kaushik ................ C08K 3/34 524/449 |
| 2015/0291791 A1* | 10/2015 | Makal ............... C08G 18/7657 502/402 |
| 2019/0062548 A1 | 2/2019 | Banet et al. |

FOREIGN PATENT DOCUMENTS

| | | |
|---|---|---|
| CN | 103102659 A | 5/2013 |
| JP | 2002037995 A | 2/2002 |
| WO | WO-2011157691 A1 | 12/2011 |
| WO | WO-2012038441 A1 | 3/2012 |

OTHER PUBLICATIONS

Guo Jun, J.C., "Investigation of Electron Beam Irradiated Acrylonitrile-Butadiene-Styrene (ABS) Under Oven Treatment", Faculty of Engineering and Science, Universiti Tunku Abdul Rahman, 2015, pp. 1-108.
International Search Report with Written Opinion for International Application No. PCT/US18/47501, dated Nov. 5, 2018.
Kraton, "Kraton Polymers For Oil Modification Versatile Solutions for Synthetic and Natural Based Oils", 2016, pp. 1-8.
U.S. Appl. No. 16/107,026, filed Aug. 21, 2018, Banet et al.

* cited by examiner

*Primary Examiner* — Ana L. Woodward
(74) *Attorney, Agent, or Firm* — Faegre Drinker Biddle & Reath LLP

(57) ABSTRACT

A conformable polymeric composition containing a polymeric material melt-blending from a composition containing (a) from about 50 to about 80 wt. % of at least one polyester thermoplastic polymer which is amorphous or becomes amorphous when melted, and (b) from about 20 to about 50 wt. % of at least one elastomeric polymer which has a flexural modulus of less than 700 MPa and a glass transition temperature less than 25° C., based on the combined weight of (a) and (b), wherein the composition is characterized by: a dead fold angle equal to or less than about 20°.

9 Claims, No Drawings

CONFORMABLE THERMOPLASTIC COMPOSITIONS AND ARTICLES

RELATED APPLICATIONS

This application claims benefit to U.S. Provisional Application Ser. No. 62/549,685 filed Aug. 24, 2017 which is incorporated by reference in its entirety for all useful purposes.

TECHNICAL FIELD

The present invention relates to compositions for producing conformable thermoplastic articles. In one embodiment, an amorphous thermoplastic polyester thermoplastic is melt processed with an elastomer to produce a rigid article with outstanding conformability when deformed. In one embodiment, the elongation at break of the composition is greater than 20% but less than 100% and the dead-fold angle is less than or equal to 20 degrees. Articles of this invention have utility in many applications including flexible and food packaging, consumer goods, toys and physical fasteners, containers, sporting goods equipment, clothing and accessories, and closures.

BACKGROUND

Polymeric materials and composites are not typically conformable. That is, they do not hold their shape after they have been deformed. Metals on they other hand, can be deformed into a shape and will hold that shape. Metals, when deformed, can rearrange their crystalline structure on the molecular level and hold their shape as a result. Polymers have a very different molecular structure. Polymers are typically very long and entangled molecules made of many repeat units. Because of this entangled molecular structure, they possess significant viscoelastic behavior. Specifically, when polymers are deformed below their glass transition temperature or melting temperatures, they will recover to their initial shape. This "memory" feature is a direct result of polymer entanglement. This entanglement feature is extremely important for polymers mechanical properties. Therefore, it is extremely difficult to design polymeric systems that are rigid, conformable, and have good mechanical properties.

A material with such properties would have significant commercial utility. Several other groups have worked to develop rigid, conformable thermoplastics for certain applications, including twist ties for flexible packaging applications. Bedford Corporation (U.S. Pat. Nos. 5,607,748, 5,827,461, 5,989,683, 6,663,809) describes various polymeric twist-tie articles that include a wing and core structure derived from compositions that are rigid. However, these compositions lack the toughness required for the application. They also do not hold shape without the core-wing design. Kyowa Corporation describes twist ties based on various crystalline polyolefin compositions (U.S. Pat. Nos. 5,154,964, 7,363,686) that require either a core-wing design or crystalline core-less composition. Kyowa also describes method to produce a twist tie in U.S. Pat. No. 5,238,631 that relies on processing a thermoplastic composition with a core-rib design using a very specific processing methodology. Based on this prior art, there exists a need for a rigid, conformable thermoplastic article that is metal free and has excellent mechanical properties. This invention describes compositions that have such characteristics.

SUMMARY

This disclosure describes conformable thermoplastic compositions and articles that have a unique combination of properties. In certain embodiments, one or more amorphous thermoplastic polymer are melt processed with an elastomer and the resulting articles have an a dead-fold angle of less than 20 degrees and show outstanding toughness, such that they can be deformed/reused multiple times. In certain embodiments, the amorphous polymer is polylactic acid (PLA). In another embodiment, the elastomer is a thermoplastic polyurethane (TPU). Articles of this invention have utility in many applications including flexible and food packaging, consumer goods, toys and physical fasteners, containers, sporting goods equipment, clothing and accessories, and closures. The thermoplastic compositions and articles of this invention have a unique combination of properties. They are conformable, have dead-fold angles of 20 degrees or less and have exceptional toughness. The articles are also ductile and have tensile properties that include certain yield characteristics. For purposes of the present invention, the following terms used in this application are defined as follows:

"Amorphous Polymeric Matrix" means a melt processable polymeric matrix that exhibits a degree of crystallinity of less than 30% in the extruded article.

"Elastomer" means a mixture of a polymeric material that has a flexural modulus of less than 700 MPa and a glass transition temperature less than 25° C.

"Melt Processable Composition" means a formulation that is melt processed, typically at elevated temperatures, by means of a conventional polymer processing technique such as extrusion or injection molding as an example.

"Melt Processing Techniques" means extrusion, injection molding, blow molding, rotomolding, or batch mixing "Conformable" means a polymeric article that when deformed maintains its shape "Rigid" means a polymeric article that has a flexural modulus >1000 MPa.

The above summary of the present invention is not intended to describe each disclosed embodiment or every implementation of the preset invention. The detailed description that follows more particularly exemplifies illustrative embodiments.

Embodiment 1 is to a conformable polymeric composition comprising a polymeric material melt-blending from a composition comprising (a) from about 50 to about 80 wt. % of at least one polyester thermoplastic polymer which is amorphous or becomes amorphous when melted, and (b) from about 20 to about 50 wt. % of at least one elastomeric polymer which has a flexural modulus of less than 700 MPa and a glass transition temperature less than 25° C., based on the combined weight of (a) and (b), wherein the composition is characterized by:

a dead fold angle equal to or less than about 20°, as determined by a method including the steps of (i) providing a sample of the twist tie having two end portions, a thickness of 1-2 mm and a length of about 100 mm; (ii) folding the sample approximately in half in the lengthwise direction so that end portions are approximately adjacent to each other; (iii) relaxing the folded sample at room temperature for three minutes; and (iv) measuring as the dead fold angle the included angle between the article sample end portions.

Embodiment 2 is the composition according to embodiment 1, comprising from about 55 wt % to about 75 wt % of the at least one matrix-forming amorphous polymer, and from about 25 wt % to about 45 wt % of the at least one elastomeric polymer, based on the combined weight thereof.

Embodiment 3 is the composition according to embodiment 1, comprising from about 55 wt % to about 70 wt % of the at least one matrix-forming amorphous polymer, and from about 30 wt % to about 45 wt % of the at least one elastomeric polymer, based on the combined weight thereof.

Embodiment 4 is the composition according to any of the embodiments 1, 2 or 3, wherein the at least one elastomeric polymer is selected from cycloolefin copolymer elastomers, thermoplastic polyurethanes, polyolefin copolymer elastomers, polybutyrate adipate terephthalates, acrylic copolymer elastomers, styrene based thermoplastic elastomers and acrylic core-shell elastomers.

Embodiment 5 is the composition according to any of the embodiments 1, 2, 3 or 4, wherein the matrix-forming amorphous polymer is a polylactic acid and the elastomeric polymer is a thermoplastic polyurethane or a polybutyrate adipate terephthalate.

Embodiment 6 is the composition according to any of the embodiments 1, 2, 3, 4 or 5, wherein the elastomeric polymer is a thermoplastic polyurethane.

Embodiment 7 is the composition according to any of the embodiments 1, 2, 3, 4, 5 or 6, wherein the dead fold angle equal to or less than about 15°.

Embodiment 8 is the composition according to any of the embodiments 1, 2, 3, 4, 5, 6 or 7, wherein the dead fold angle equal is from 5 to 19°.

Embodiment 9 is the composition according to any of the embodiments 1, 2, 3, 4, 5, 6, 7 or 8, wherein the dead fold angle equal is from 12 to 19°.

Embodiment 10 is an article which comprises the composition according to any of the embodiments 1, 2, 3, 4, 5, 6, 7 or 8, wherein the article is selected from the group consisting of flexible and food packaging, consumer goods, toys, physical fasteners, containers, sporting goods equipment, clothing and accessories, and closures.

Embodiment 11 is the article of the embodiment 10 wherein the article is selected from the group consisting of food packaging, food wrap, cable ties, flexible toys that hold shape (similar to gumby doll concept), pool noodles, hair (also can be used in Halloween costumes) and clothing accessories, support bras, adjustable athletic braces, gift boxes that can hold its shape, bags including grocery bags that can hold their shapes, flexible straws, flexible catheters/medical tubing, flexible electric or fiber optic cords, bendable Christmas lights, conformable sheets for building and construction applications, foldable projection screen, impact sensors, impact adsorbing bumpers, shapeable glasses including safety glasses, insoles for shoes, ear buds, shapable fasteners, shoelaces, conformable athletic shoes and equipment.

DETAILED DESCRIPTION

The amorphous thermoplastic polymer matrix of this invention has certain requirements. The flexural modulus of the amorphous thermoplastic matrix must be such that the resulting article has enough stiffness to hold its shape after deformation. In one embodiment, the amorphous polymer matrix has a flexural modulus of at least 1000 MPa, in a preferred embodiment it has a flexural modulus of at least 1200 MPa, and in a most preferred embodiment, it has a flexural modulus of at least 1500 MPa. In one embodiment, amorphous thermoplastic matrix of this invention typically has a degree of crystallinity less than 30% in the extruded article, in a preferred embodiment the degree of crystallinity is less than 20% and in a most preferred embodiment the degree of crystallinity is less than 10%. The amorphous polymer matrix of this invention can inherently have low to no crystallinity or it can be a crystalline polymer that is melt processed in a way such that polymer is rapidly quenched prior to significant levels of crystallization. This can be achieved by rapidly cooling the extrudate after it leaves the die of the extruder. Non-limiting examples of polymers useful as the amorphous polymer matrix in this invention include polyesters. In some embodiments, polylactic acid are well suited to serve as polymeric matrices.

The conformable thermoplastic compositions of this invention involve melt processing an amorphous thermoplastic matrix with an elastomer. In one embodiment, the elastomers useful in this invention have good compatibility with the amorphous polymeric matrix. In such articles, the compositions may have good optical clarity as a result of the compatibility. The addition of the elastomer to the rigid thermoplastic matrix has the effect of toughening the resulting article. This effect can be quantified by examining the degree of elongation or necking after the article until it breaks during a tensile test. In one embodiment, the degree of elongation at break is greater than 20% but less than 100%, in a preferred embodiment it is greater than 30% but less than 90%. Non-limiting examples of elastomers useful in this invention include: cyclic olefin copolymer elastomers, thermoplastic polyurethanes, polyolefin copolymer elastomers, acrylic copolymer elastomers, thermoplastic elastomers and acrylic core-shell elastomers.

A preferred amorphous polymer is polylactic acid (PLA), which those skilled in the art will understand is not a true acid but rather an aliphatic polyester, characterized by the moiety $[CH(CH_3)C(=O)O]_n$. It may be appreciated that while PLA is semi-crystalline, it crystallizes at a slow rate. Melt-blending with an elastomeric polymer prevents crystallization. Accordingly, PLA is an example of a polymer that becomes amorphous when melt-blended with an elastomer.

The elastomer in this invention is generally included in the amorphous thermoplastic matrix at amounts ranging from 20 wt % to about 50 wt % depending on the specific elastomer and polyester thermoplastic matrix. For example, when the thermoplastic matrix is a polylactic acid, the elastomer concentration required to produce a functional article in this invention is between 20-40 wt %, more preferably 25-35 wt %.

Non-limiting examples of elastomers useful in the practice of the invention include: cycloolefin copolymer elastomers, thermoplastic polyurethanes, polyolefin copolymer elastomers, polybutyrate adipate terephthalate, acrylic copolymer elastomers, styrene based thermoplastic elastomers, such as block copolymers of styrene-butadiene-styrene, styrene-isoprene-styrene, styrene-ethylene/butylene-styrene and styrene-ethylene/propylene-styrene and core-shell elastomers as described in WO2012038441A1. In some embodiments, the elastomer is a cycloolefin copolymer elastomer, a thermoplastic polyurethane or a polybutyrate adipate terephthalate.

In another embodiment, the melt processable composition comprising the matrix-forming amorphous polymer and the elastomeric polymer may contain other reinforcing fillers to tailor the mechanical properties of the conformable polymeric composition. The fillers and fibers may be incorporated into the melt processable composition in the form of powders, pellets, granules or any other extrudable form. The amount and type of fillers in the melt processable composition may vary depending on the polymeric matrix and desired physical properties. Those skilled in the art of melt processing are capable of selecting appropriate amounts and types of fillers to match the specific polymeric matrix in order to achieve the desired physical properties in the finished material. Non-limiting examples of fillers useful in this invention include: silicates, aluminoslicates, talc, mica, wollastonite, carbon fiber, glass fiber, glass microspheres, hollow glass microspheres, cellulosic fibers and fillers.

In another aspect of the invention, the polymeric matrix may contain other additives to provide certain functionality. Non-limiting examples of conventional additives include antioxidants, light stabilizers, blowing agents, foaming additives, antiblocking agents, heat stabilizers, impact modifiers, biocides, antimicrobial additives, compatibilizers, plasticizers, tackifiers, processing aids, lubricants, coupling agents, flame retardants, colored streakers. The additives may be incorporated into the melt processable composition in the form of powders, pellets, granules, or in any other extrudable form. The amount and type of conventional additives in the melt processable composition may vary depending upon the polymeric matrix and the desired physical properties of the finished composition. Those skilled in the art of melt processing are capable of selecting appropriate amounts and types of additives to match with a specific polymeric matrix in order to achieve desired physical properties of the finished material.

Melt-processing of the conformable thermoplastic compositions are typically performed at a temperature from 80° to 300° C., although optimum operating temperatures are selected depending upon the melting point, melt viscosity, and thermal stability of the composition. Different types of melt processing equipment, such as extruders, may be used to process the melt processable compositions of this invention.

The composites of this invention are suitable for manufacturing articles for many applications including flexible and food packaging, consumer goods, toys, physical fasteners, containers, sporting goods equipment, clothing and accessories, and closures. Specific examples of suitable manufactured articles include: food packaging, food wrap, cable ties, flexible toys that hold shape, pool noodles, hair and clothing accessories, support bras, adjustable athletic braces (bowling), gift boxes, flexible straws, flexible catheters, flexible electric or fiber optic cords, Christmas lights, conformable sheets for building and construction applications, foldable projection screen, impact sensors, impact adsorbing bumpers, shapeable glasses, insoles for shoes, ear buds, shapable fasteners, shoelaces, conformable athletic shoes and equipment. The composites of the invention can exclude non metallic ties.

EXAMPLES

The materials listed in Table 1 where utilized to prepare the compositions of Table 2 that were melt-processed into strands according to the conditions set forth under "SAMPLE PREPARATION". The proportions of Table 2 are weight percent values, based on the combined weight of amorphous polymer and elastomer blended.

TABLE 1

| Material | Polymer type | Supplier |
| --- | --- | --- |
| PLA (polylactic acid) | amorphous polymer | NatureWorks-Ingeo 2003D |
| TPU1 (thermoplastic polyurethane) | elastomer | BASF-Elastollan ® C78A10 |
| TPU2 (thermoplastic polyurethane) | elastomer | BASF-Elastollan ® Soft 35A12P |
| TPU3 (thermoplastic polyurethane) | elastomer | BASF-Elastollan ® 45A12P |
| TPU4 (thermoplastic polyurethane) | elastomer | Huntsman-Irogran ® TPU A 92 P 4637 |
| TPU5 (thermoplastic polyurethane) | elastomer | BASF-Elastollan ® 1185A10 Nat |
| PBAT (polybutyrate adipate terephthalateate) | elastomer | BASF-Ecoflex ® F Blend C1200 |

TABLE 2

| Example | PLA | TPU1 | TPU2 | TPU3 | TPU4 | TPU5 | PBAT |
| --- | --- | --- | --- | --- | --- | --- | --- |
| 1 | 55 | 45 | | | | | |
| 2 | 60 | 40 | | | | | |
| 3 | 65 | 35 | | | | | |
| 4 | 70 | | | | | | 30 |
| 5 | 75 | | 25 | | | | |
| 6 | 70 | | 30 | | | | |
| 7 | 65 | | 35 | | | | |
| 8 | 60 | | 40 | | | | |
| 9 | 75 | | | 25 | | | |
| 10 | 70 | | | 30 | | | |
| 11 | 65 | | | 35 | | | |
| Comparative ex. 12 | 60 | | | 40 | | | |
| Comparative ex. 13 | 55 | | | 45 | | | |
| 14 | 75 | | | | 25 | | |
| 15 | 70 | | | | 30 | | |
| 16 | 65 | | | | 35 | | |
| 17 | 60 | | | | 40 | | |
| 18 | 55 | | | | 45 | | |
| 19 | 70 | | | | | 30 | |
| 20 | 65 | | | | | 35 | |
| 21 | 60 | | | | | 40 | |

Sample Preparation

Matrix-forming amorphous polymer (PLA) and elastomer (TPU, PBAT) were dry blended in a plastic bag and gravimetrically fed into a 11 mm twin screw extruder (commercially available from Thermo Scientific, 40:1 L:D). For examples 1-18, the compounding was performed at a 210° C. temperature profile for zones 1-10 with the die temperature of 160° C. at 160 rpm screw speed and 14 g/min output. For examples 19-21, the compounding was performed at a 220° C. temperature profile for zones 1-10 with the die temperature of 170° C. at 160 rpm screw speed and 14 g/min output. The compounds were extruder through a 2.5 mm round orifice die and quenched in a water bath at a temperature of about 20° C. to about 35° C. The resulting samples were tested for dead fold performance; twist performance and bend repeat performance using the following test methods.

Test Methods

The samples were subjected to the following test methods.

Dead-Fold Angle Test.

The dead fold angle test measures the degree of memory a blend exhibits when it is folded 180 degrees. The term "memory" means the ability of the polymeric twist tie to remain in a position when the polymeric twist tie is formed into the position. In this test, a sample is folded approximately in half so that the end portions of the polymeric twist tie are approximately adjacent to each other. After relaxing for three minutes at room temperature, the angle of relaxation is obtained by measuring an included angle between the end portions. The polymeric twist ties of the present invention exhibits a dead fold angle of less than or equal to 20°.

Repeat Bend Test.

The repeat bend test determines how many times a polymeric twist tie can survive an alternating 180° fold. The alternating 180° fold is an especially important characteristic when the polymeric twist tie is used as a replacement for a tin tie. For this test, a sample of the polymeric twist tie is folded until end portions of the polymeric twist tie are approximately adjacent to each other, for one bend. Then, the polymeric twist tie sample is folded in the opposite direction, for a second bend. The alternating bend test is repeated ten times. It is believed that ten alternating folds is greater than what would be expected under typical use conditions. The repeat bend test does not cause breaking or cracking of the polymeric twist ties of the present invention.

The results of the aforementioned tests are set forth in Table 3.

Results

TABLE 3

| Example | Dead-fold Angle Test (°) | Repeat Bend Test (number of bends) |
| --- | --- | --- |
| 1 | 15 | 4 |
| 2 | 14 | 3 |
| 3 | 19 | 2 |
| 4 | 5 | 4 |
| 5 | 17 | 9 |
| 6 | 16 | >10 |
| 7 | 17 | >10 |
| 8 | 12 | >10 |
| 9 | 12 | 3 |
| 10 | 12 | 6 |
| 11 | 13 | >10 |
| Comparative ex. 12 | 29 | >10 |
| Comparative ex. 13 | 83 | >10 |
| 14 | 18 | 1 |
| 15 | 16 | 1 |
| 16 | 18 | 3 |
| 17 | 19 | 5 |
| 18 | 19 | >10 |
| 19 | 7 | >10 |
| 20 | 6 | >10 |
| 21 | 5 | >10 |

All references disclosed herein are incorporated by reference. Although specific embodiments have been illustrated and described herein for purposes of description of the preferred embodiments, it will be appreciated by those of ordinary skill in the art that a wide variety of alternate or equivalent implementations calculated to achieve the same purposes may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

What is claimed is:

1. A conformable polymeric composition comprising a polymeric material melt processed from a composition comprising (a) from 60 to 75 wt. % of at least one polyester thermoplastic polymer which is amorphous or becomes amorphous when melted, and (b) from 25 to 40 wt. % of at least one elastomeric polymer which is a thermoplastic polyurethane and which has a flexural modulus of less than 700 MPa and a glass transition temperature less than 25°C., based on the combined weight of (a) and (b), wherein the composition is characterized by:
a dead fold angle equal to or less than 10°, as determined by a method including the steps of (i) providing a sample having two end positions, a thickness of 1-2 mm and a length of about 100 mm; (ii) folding the sample approximately in half in the lengthwise direction so that end portions are approximately adjacent to each other; (iii) relaxing the folded sample at room temperature for three minutes; and (iv) measuring as the dead fold angle which is the included angle between the article sample end portions.

2. The composition according to claim 1, comprising from 60 wt % to about 70 wt % of the at least one polyester thermoplastic polymer which is amorphous or becomes amorphous when melted, and from about 30 wt % to 40 wt % of the at least one elastomeric polymer, based on the combined weight thereof.

3. The composition according to claim 2, wherein the at least one polyester thermoplastic polymer which is amorphous or becomes amorphous when melted is a polylactic acid.

4. The composition according to claim 3, wherein the dead fold angle is equal to or less than 7°.

5. An article which comprises the composition according to claim 4, wherein the article is selected from the group consisting of food wrap and food packaging, consumer goods, toys, physical fasteners, containers, sporting goods equipment, clothing, and closures.

6. The article according to claim 5, wherein the article is selected from the group consisting of food packaging, food wrap, cable ties, flexible toys that hold shape, pool noodles, hair and clothing accessories, support bras, adjustable athletic braces, gift boxes, flexible straws, flexible catheters, flexible electric or fiber optic cords, Christmas lights, conformable sheets for building and construction applications, foldable projection screen, impact sensors, impact adsorbing bumpers, shapeable glasses, insoles for shoes, ear buds, shapable fasteners, shoelaces, conformable athletic shoes and equipment.

7. The composition according to claim 1 wherein the dead fold angle is equal to or less than 7°.

8. An article which comprises the composition according to claim 1, wherein the article is selected from the group consisting of food wrap and food packaging, consumer goods, toys, physical fasteners, containers, sporting goods equipment, clothing, and closures.

9. The article according to claim 8, wherein the article is selected from the group consisting of food packaging, food wrap, cable ties, flexible toys that hold shape, pool noodles, hair and clothing accessories, support bras, adjustable athletic braces, gift boxes, flexible straws, flexible catheters, flexible electric or fiber optic cords, Christmas lights, conformable sheets for building and construction applications, foldable projection screen, impact sensors, impact adsorbing bumpers, shapeable glasses, insoles for shoes, ear buds, shapable fasteners, shoelaces, conformable athletic shoes and equipment.

* * * * *